(12) United States Patent
Yannone

(10) Patent No.: US 8,436,762 B2
(45) Date of Patent: May 7, 2013

(54) DETERMINING AT LEAST ONE COORDINATE OF AN OBJECT USING INTERSECTING SURFACES

(75) Inventor: Ronald M. Yannone, Nashua, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 352 days.

(21) Appl. No.: 12/751,875

(22) Filed: Mar. 31, 2010

(65) Prior Publication Data

US 2011/0227783 A1 Sep. 22, 2011

Related U.S. Application Data

(63) Continuation-in-part of application No. 12/364,480, filed on Feb. 2, 2009, now Pat. No. 8,081,106, and a continuation-in-part of application No. 12/498,310, filed on Jul. 6, 2009, now Pat. No. 8,164,510.

(60) Provisional application No. 61/063,251, filed on Jan. 31, 2008, provisional application No. 61/063,290, filed on Jan. 31, 2008, provisional application No. 61/063,271, filed on Jan. 31, 2008, provisional application No. 61/063,207, filed on Jan. 31, 2008.

(51) Int. Cl.
*G01S 13/42* (2006.01)
(52) U.S. Cl.
USPC ............ 342/29; 342/133; 342/139; 342/140; 342/141; 342/146; 342/147; 342/156
(58) Field of Classification Search .................... 342/29, 342/133, 139–141, 146, 147, 152, 156
See application file for complete search history.

(56) References Cited

U.S. PATENT DOCUMENTS 3,895,382 A 7/1975 Litchford
4,293,857 A 10/1981 Baldwin
(Continued)

FOREIGN PATENT DOCUMENTS

WO 2006135416 12/2006
WO 2007065879 6/2007
WO 2008051204 5/2008

OTHER PUBLICATIONS

IP.com Prior Art Database Disclosure (Source: IPCOM) Disclosure No. IPCOM000073013D dated Oct. 1, 1970 Added to Prior Art Database on Feb. 22, 2005 Disclosed by: IBM (TDB 10-70 p. 1342-1344) Raabe, HP—Author Disclosure File: 3 pages.*

(Continued)

*Primary Examiner* — John B Sotomayor
(74) *Attorney, Agent, or Firm* — Graybeal Jackson LLP; Bryan Santarelli

(57) ABSTRACT

In an embodiment, a coordinate determiner is operable to identify at least first and second surfaces that each approximately intersect an object, and to determine at least two approximate coordinates of the object from the first and second surfaces, where at least one of the surfaces is nonplanar. For example, if the coordinate determiner is disposed on a fighter jet having at least two short-baseline-interferometers (SBIs), then two surfaces may be the surfaces of two cones having two of the SBIs as respective vertices, the object may be a close-in target, and the coordinate determiner may determine the azimuth and elevation of the target from the cone surfaces. Furthermore, the coordinate determiner or another computation unit onboard the jet may determine the slant range of the target from the elevation and the altitude of the jet. The coordinate determiner may at least facilitate ranging of the target quickly enough to allow a pilot sufficient time to evade detection by the target, to destroy the target, or to evade or destroy a projectile fired by the target.

32 Claims, 10 Drawing Sheets

U.S. PATENT DOCUMENTS

| | | | |
|---|---|---|---|
| 4,370,656 | A | 1/1983 | Frazier et al. |
| 4,668,954 | A | 5/1987 | Tomasi |
| 4,845,502 | A * | 7/1989 | Carr et al. .................. 342/430 |
| 5,059,967 | A * | 10/1991 | Roos ........................ 342/26 B |
| 5,189,429 | A * | 2/1993 | Guard ........................ 342/424 |
| 5,198,822 | A * | 3/1993 | Brown ........................ 342/424 |
| 5,237,333 | A * | 8/1993 | Guard ........................ 342/424 |
| 5,247,307 | A | 9/1993 | Gandar et al. |
| 5,457,466 | A * | 10/1995 | Rose ........................ 342/442 |
| 5,479,360 | A | 12/1995 | Seif et al. |
| 5,557,282 | A * | 9/1996 | Mertens .................... 342/123 |
| 5,566,074 | A | 10/1996 | Hammer |
| 5,977,906 | A | 11/1999 | Ameen et al. |
| 6,046,695 | A * | 4/2000 | Poehler et al. ............ 342/25 A |
| 6,150,979 | A | 11/2000 | Tsui |
| 6,292,136 | B1 * | 9/2001 | Egnell ........................ 342/432 |
| 6,564,149 | B2 | 5/2003 | Lai |
| 6,614,012 | B2 | 9/2003 | Schneider et al. |
| 6,674,434 | B1 | 1/2004 | Chojnacki et al. |
| 6,690,317 | B2 * | 2/2004 | Szeto et al. ................ 342/26 R |
| 6,809,679 | B2 | 10/2004 | LaFrey et al. |
| 6,963,291 | B2 | 11/2005 | Holforty et al. |
| 7,002,510 | B1 | 2/2006 | Choate et al. |
| 7,132,961 | B2 | 11/2006 | Yannone et al. |
| 7,358,891 | B2 * | 4/2008 | Struckman et al. ........... 342/156 |
| 7,418,343 | B1 | 8/2008 | McGraw et al. |
| 7,453,400 | B2 | 11/2008 | Struckman et al. |
| 7,579,989 | B2 | 8/2009 | Winterling et al. |
| 7,764,217 | B2 | 7/2010 | Yannone |
| 8,159,387 | B1 * | 4/2012 | Fernandez et al. ........... 342/146 |
| 8,164,510 | B2 * | 4/2012 | Yannone ........................ 342/29 |
| 2004/0178943 | A1 * | 9/2004 | Niv ................................ 342/29 |
| 2005/0110661 | A1 | 5/2005 | Yannone |
| 2009/0231181 | A1 | 9/2009 | Yannone |
| 2009/0310664 | A1 | 12/2009 | Yannone |
| 2010/0156697 | A1 * | 6/2010 | Yannone ........................ 342/29 |
| 2010/0207762 | A1 | 8/2010 | Lee et al. |
| 2011/0227783 | A1 * | 9/2011 | Yannone ....................... 342/156 |
| 2012/0051598 | A1 * | 3/2012 | Ikeda ............................ 382/103 |

OTHER PUBLICATIONS

Ross L. Finney, Maurice D. Weir & Frank R. Giordano, "Lines and Planes in Space", "Thomas' CALCULUS", 10th edition, 2003, pp. 807-808, Addison Wesley, Boston, USA.

* cited by examiner

DETERMINING AT LEAST ONE COORDINATE OF AN OBJECT USING INTERSECTING SURFACES

CLAIM OF PRIORITY

The present application is a Continuation In Part of U.S. patent application Ser. No. 12/364,480, filed Feb. 2, 2009, now U.S. Pat. No. 8,081,106, issued Dec. 20, 2011 and of U.S. patent application Ser. No. 12/498,310, filed Jul. 6, 2009, now U.S. Pat. No. 8,164,510, issued Apr. 24, 2012; which applications claim priority to U.S. Provisional Application Ser. Nos. 61/063,251, 61/063,290, 61/063,271 and 61/063,207, filed on Jan. 31, 2008, now expired. All of the foregoing applications are incorporated herein by reference in their entireties.

STATEMENT OF GOVERNMENT INTEREST

The invention was made with United States Government support under Contract No. N00019-02-C-3002. Accordingly, the United States Government has certain rights in this invention.

SUMMARY

This Summary is provided to introduce, in a simplified form, a selection of concepts that are further described below in the Detailed Description. This Summary is not intended to identify key features or essential features of the claimed subject matter, nor is it intended to be used to limit the scope of the claimed subject matter.

In an embodiment, a coordinate determiner is operable to identify first and second surfaces that each approximately intersect an object, and to determine at least two approximate coordinates of the object from the first and second surfaces, where at least one of the surfaces is nonplanar.

For example, if the coordinate determiner is disposed on a fighter jet having at least two short-baseline-interferometers (SBIs), then the two surfaces may be the surfaces of two cones having two of the (SBIs) as respective vertices, the object may be a close-in target, and the coordinate determiner may determine the azimuth and elevation of the target relative to the jet from the cone surfaces. Furthermore, the coordinate determiner or another component of the jet's onboard computer system may determine the slant range of the target from the elevation and the altitude of the jet. The coordinate determiner may facilitate ranging of the target quickly enough to allow the jet pilot sufficient time to evade detection by the target, to destroy the target, or to evade or destroy a projectile fired by the target.

DETAILED DESCRIPTION

Figure 1:
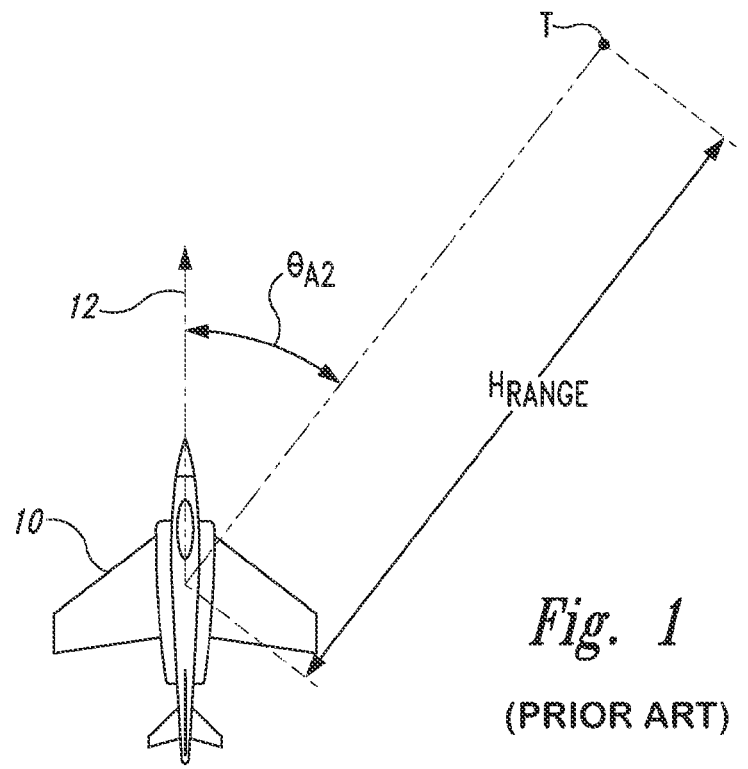
FIG. 1 is an overhead view of an embodiment of a fighter jet and a target.

FIG. 1 is an overhead view of an embodiment of a fighter jet 10 traveling at a heading 12 and at a level altitude, and of an object, here a target T, which may be airborne, ground based, moving, or stationary. The target T is located at an azimuth angle $\theta_{AZ}$ from the heading 12 and at an azimuth range $H_{RANGE}$ from the jet 10.

Figure 2:
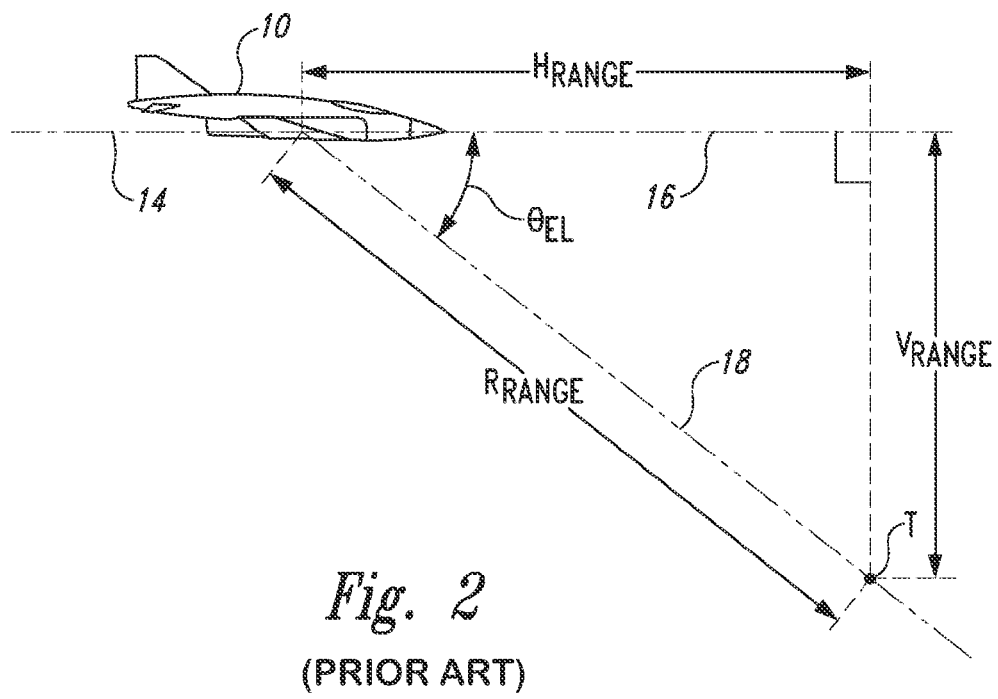
FIG. 2 is a side-elevation view of the fighter jet and target of FIG. 1.

FIG. 2 is a side elevation view of the fighter jet 10 and the target T of FIG. 1. The target T is located at an elevation angle $\theta_{EL}$ from the jet azimuth plane 14, at a vertical distance $V_{RANGE}$ from the jet 10, and at a slant range $R_{RANGE}$ (hereinafter R) from the jet.

Geometrically speaking, the target T lies in an elevation plane which is perpendicular to the jet azimuth plane 14 and which includes the straight line 16 along which $H_{RANGE}$ is measured. For example, in this embodiment, the elevation plane may be coincident with the page of FIG. 2.

Referring to FIGS. 1 and 2, the fighter jet 10 typically includes an onboard computer system (not shown in FIGS. 1 and 2) for detecting the target T, and for determining one or more of the following targeting quantities: $\theta_{AZ}$, $\theta_{EL}$, R, $H_{RANGE}$, and $V_{RANGE}$. For example, the computer system may actively detect and range (i.e., determine R for) the target T by transmitting a signal (e.g., a radar signal) that impinges upon, and that is reflected back to the jet 10 by, the target T, and by receiving the reflected signal with a directional antenna (not shown in FIGS. 1 and 2). The computer system may then determine $\theta_{AZ}$ and $\theta_{EL}$ by analyzing the phase of the received signal at each of multiple elements of the antenna.

Alternatively, the onboard computer system may passively detect and range the target T by similarly analyzing a signal emitted by the target T to determine $\theta_{AZ}$ and $\theta_{EL}$. Passive detection may be useful, for example, when the pilot of the fighter jet 10 does not want to alert the personnel manning the target T to the jet's presence, or when the target is difficult or impractical to actively detect.

Unfortunately, a conventional passive-target-detection computer system may be unable to range a target with the level of speed and accuracy that is required for applications such as target evasion or destruction (e.g., by firing a missile). For example, "close-in" targets (also called "pop-up" targets) may be defined as ground-based targets (e.g., a hand-held rocket launcher) that that are within a slant range of approximately 1-20 nautical miles (NM) of an aircraft such as a fighter jet. But because close-in targets may generate only one or a few targeting pulses before firing, a passive-detection computer system using a conventional technique such as signal-to-noise-ratio (SNR) analysis may be unable to range the target quickly enough to allow a pilot sufficient time to evade detection by the target, to destroy the target, or to evade or destroy a projectile (e.g., a missile) fired by the target.

Discussed below, however, are embodiments of techniques that a passive-target-detection computers system may implement to range a target, such as a close-in target, with a level of speed and accuracy sufficient to allow a pilot enough time to evade detection by the target, to destroy the target, or to evade or destroy a projectile fired by the target.

Figure 3:
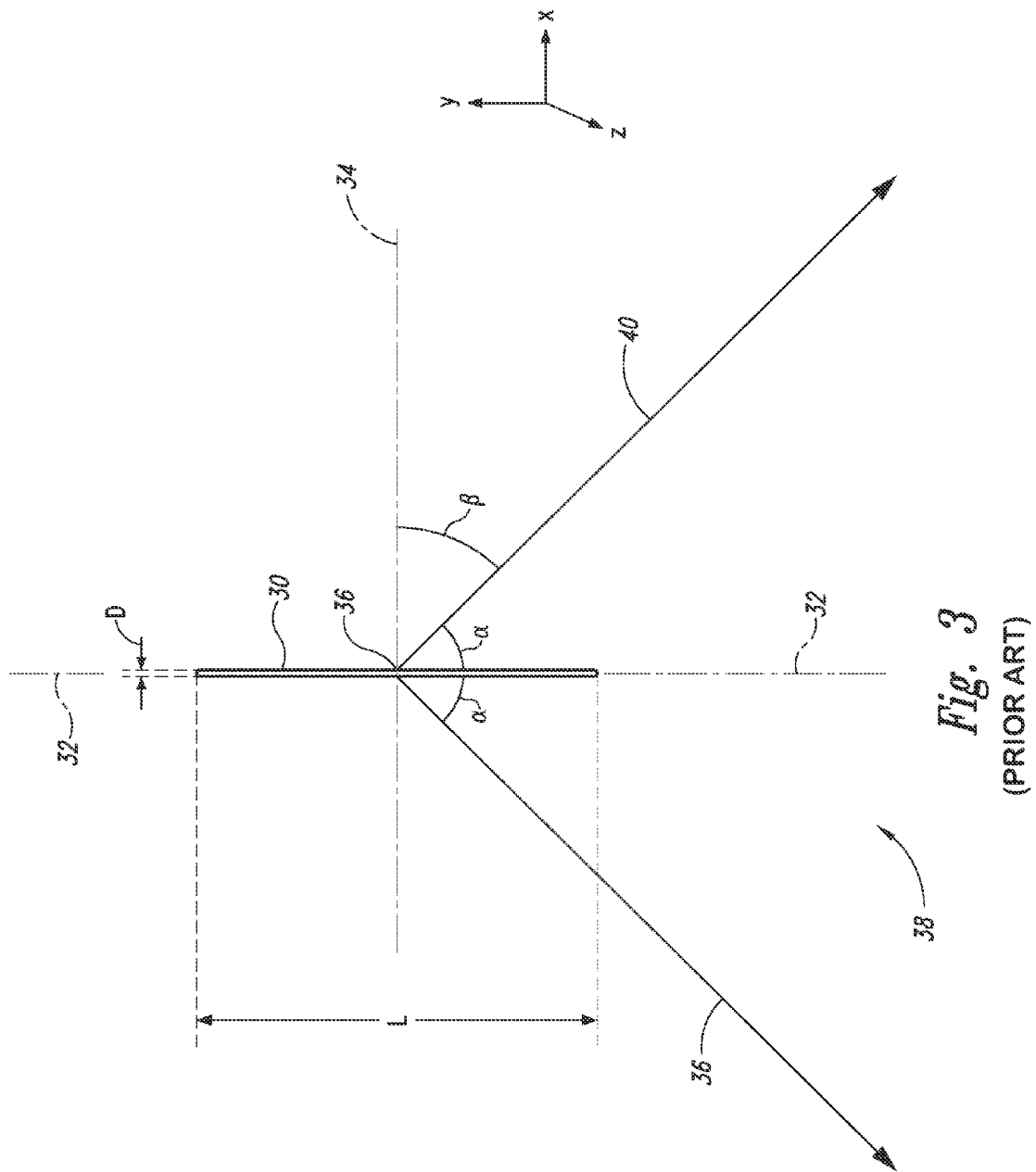
FIG. 3 is a side view of a short-baseline-interferometer (SBI) and a cone surface that is effectively defined by a signal received with the (SBI).

FIG. 3 is a side view of an embodiment of SBI 30, which is an antenna array that may allow a computer system to sense the angle at which the SBI receives a signal, such as a signal emitted from a close-in target T.

The SBI 30 is approximately cylindrical, and has a length L that is much greater (e.g., ten or more times greater) than its diameter D.

The SBI 30 also has a longitudinal axis 32, and has a boresight axis 34, which passes through the center 36 of the SBI perpendicular to the longitudinal axis.

In response to a signal received from, e.g., a close-in target T, the SBI 30 generates one or more array signals having respective magnitudes and phases, and a computer system may calculate from these array signals the angle $\beta$ that the received signal makes with the boresight axis 34.

From the angle $\beta$, the computer system may identify a cone 38 having a cone angle $\alpha$ and a cone surface 40 that intersects the target T. The cone angle $\alpha$ is given by the following equation:

$$\alpha = 90° - \beta \quad (1)$$

And the cone surface 40 is given by the following equation:

$$x^2 + z^2 = y^2 \tan^2 \alpha$$

where the z axis is normal to the plane in which of FIG. 3 lies.

Still referring to FIG. 3, because the SBI 30 may introduce an error into the calculation of the boresight angle $\beta$, the cone surface 40 may not actually intersect the target T, but may pass relatively close to T; therefore, one may say that the cone surface 40 approximately intersects T, where "approximately" means that the cone surface 40 actually intersects T, or comes relatively close to intersecting T.

Furthermore, this SBI error may be proportional to 1/cos $\beta$, such that the SBI error is a minimum when $\beta = 0°$, and is a maximum (and may approach infinity) when $\beta$ approaches ±90°. For example, the SBI 1-sigma error value $\sigma_{SBI\_error}$ may be approximately 3° when $\beta = 0°$, and may be approximately 34° when $\beta = 85°$. One may account for this error when determining one or more coordinates of the target T as discussed below.

Still referring to FIG. 3, although the SBI 30 may allow a targeting computer system to quickly determine an accurate value for $\beta$—the computer system may be able to determine an accurate value for $\beta$ in 100 milliseconds (ms) or less after the SBI 30 receives only a single targeting pulse from the target T—$\beta$ alone is insufficient to range, or to otherwise identify the location of, the target T.

But as discussed below, by using a signal received simultaneously by multiple SBIs, received sequentially by a single SBI in multiple positions, or received sequentially by multiple SBIs in multiple positions, a targeting computer system may locate a close-in target T with sufficient speed and accuracy to allow a pilot time to evade or destroy the target or a projectile launched by the target.

Figure 4A:
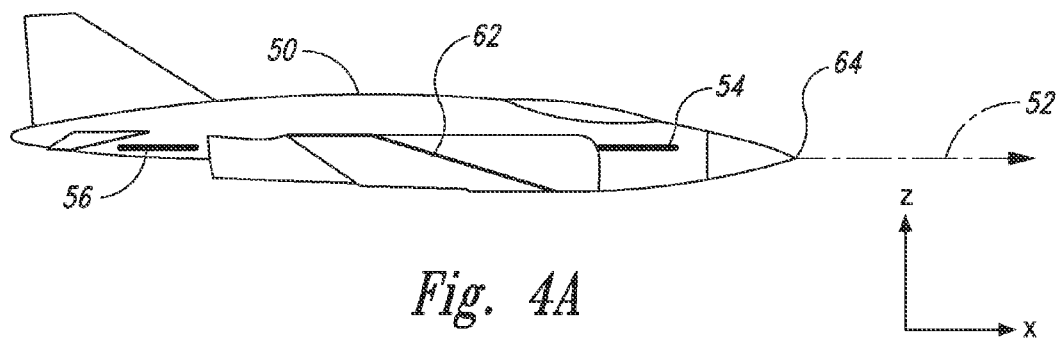
FIGS. 4A and 4B are respective side-elevation and overhead views of an embodiment of a fighter jet and two SBIs mounted to a side of the jet.
Figure 4B:
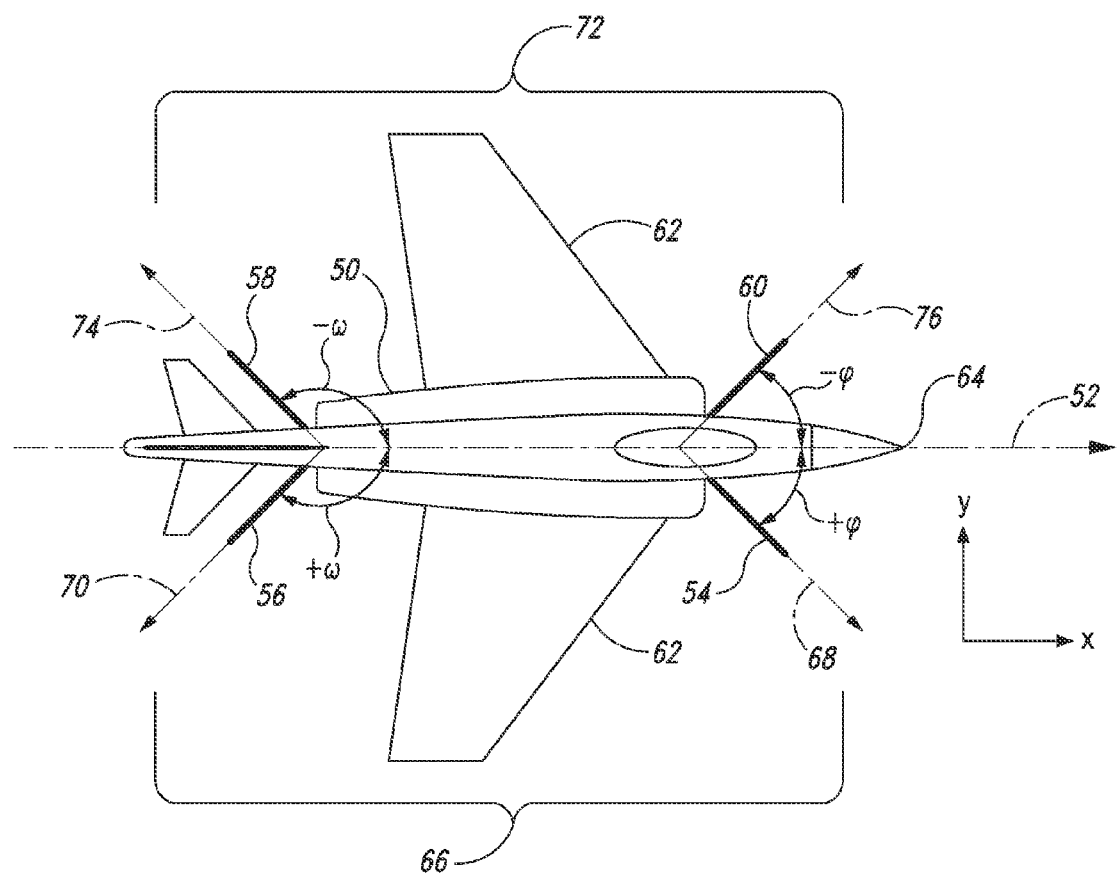

FIGS. 4A and 4B are side-elevation and overhead views, respectively, of a fighter jet 50 flying at a heading 52, and of four SBIs 54, 56, 58, and 60 mounted to the sides of the jet (only SBIs 54 and 56 are visible in FIG. 4A) according to an embodiment.

Each of the SBIs 54, 56, 58, and 60 are mounted approximately in the plane of the wings 62 of the jet 50 such that when the jet is in level flight, the SBIs are approximately parallel to the ground (not shown in FIGS. 4A and 4B) and the z-axis components of the SBIs are approximately zero.

The SBIs 54 and 60 are mounted at angles +$\phi$ and –$\phi$, respectively, in the x-y plane relative to the nose 64 of the jet 50, and the SBIs 56 and 58 are mounted at angles +$\omega$ and –$\omega$, respectively, in the x-y plane relative to the nose.

As discussed in more detail below in conjunction with FIGS. 5-9, the SBIs 52 and 54 are positioned to locate targets disposed within a three-dimensional region 66 located on the right side of the jet 50 and bounded in part by the longitudinal SBI axes 68 and 70. Similarly, the SBI's 56 and 58 are positioned to locate targets disposed within a three-dimensional region 72 on the left side of the jet 50 bounded in part by the longitudinal SBI axes 74 and 76. Hereinafter, the operation of only the SBIs 52 and 54 is discussed in detail, it being understood that the operation of the SBIs 56 and 58 may be similar.

Figure 5:
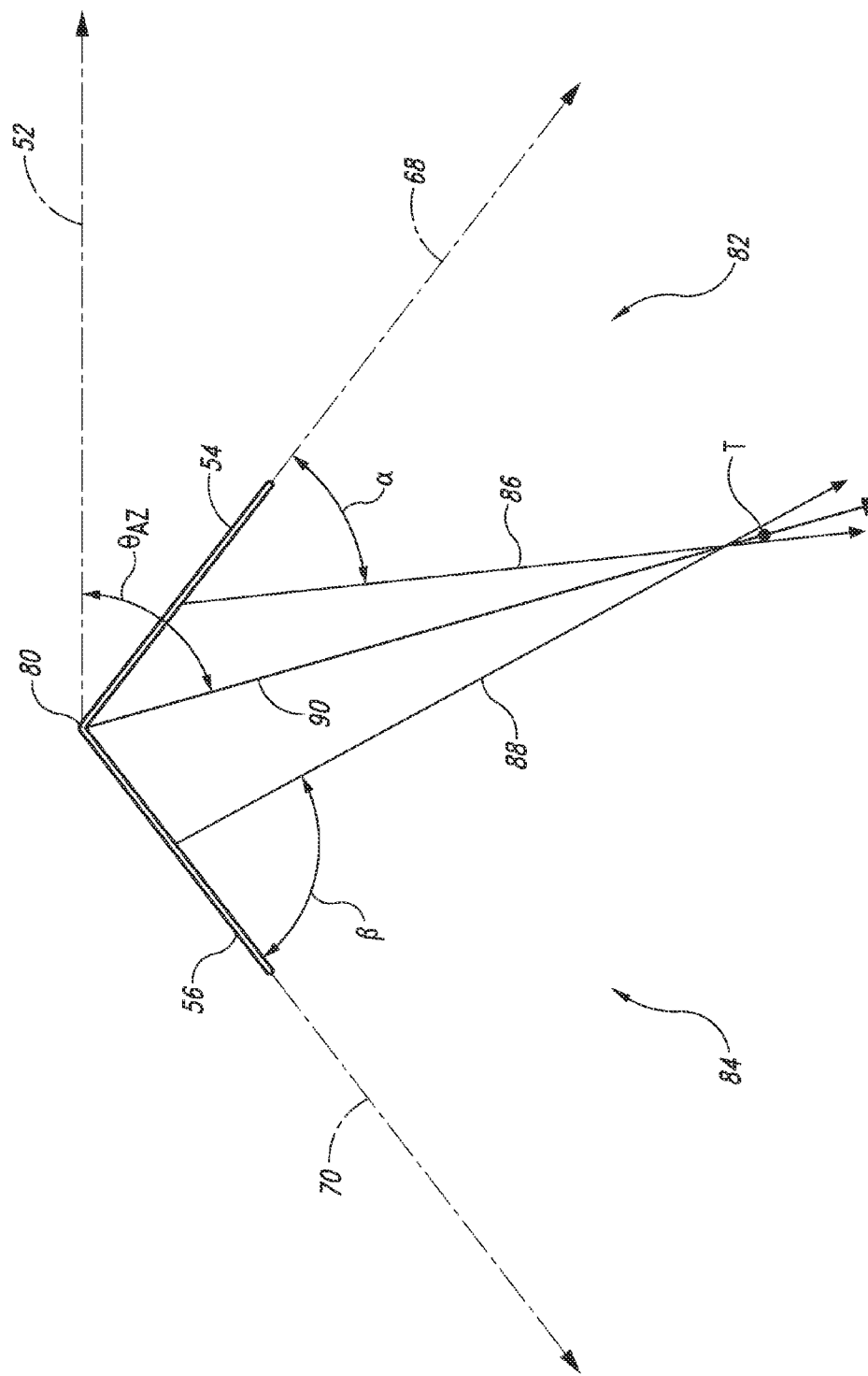
FIG. 5 is an overhead view of an embodiment of the SBIs of FIGS. 4A and 4B, a target, and the intersecting cone surfaces effectively formed between the target and the respective SBIs.
Figure 6:
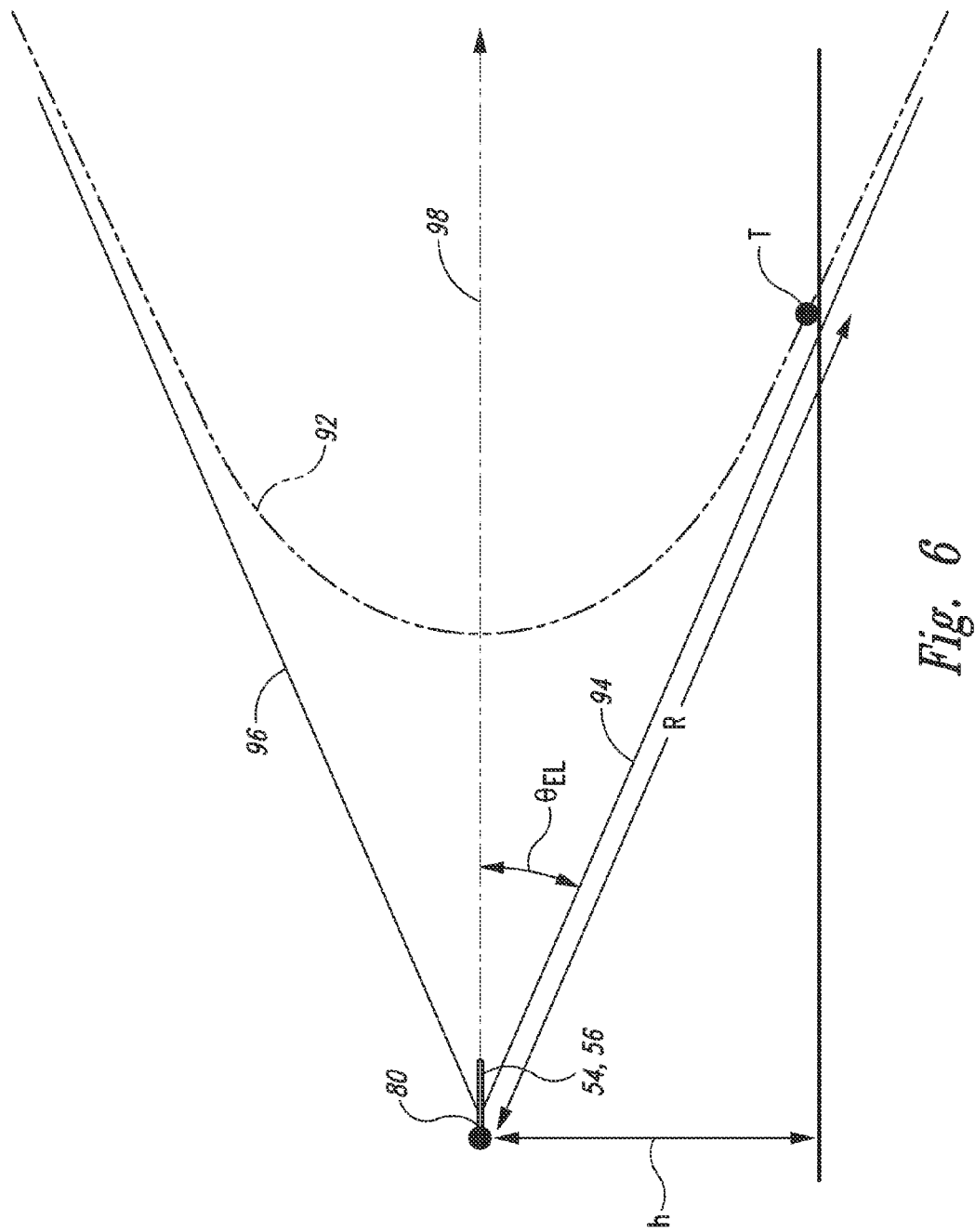
FIG. 6 is a side view of the cone-surface-intersection plane of FIG. 5, and of the curve that lies in this plane and along which the cone surfaces of FIG. 5 intersect.

Referring to FIGS. 5 and 6, a technique for determining one or more coordinates of a target T using the two SBI's 54 and 56 of FIG. 4 is discussed, it being understood that the technique may be similar using the SBI's 58 and 60.

FIG. 5 is an overhead view of the SBI's 54 and 56 (the fighter jet 50 has been omitted from FIG. 5) of FIG. 4, wherein FIG. 5 lies in, or is parallel to, an azimuth plane that intersects the center of the fighter jet and that is parallel to the ground (for purposes of discussion the ground is estimated to be a plane). Furthermore, FIG. 5 may not be drawn to scale.

To simplify the mathematics, one may assume that the SBI's 54 and 56 emanate from a common point 80, instead of being separated by, a non zero distance e.g., 3-20 meters, per FIG. 4. Because the target T is much farther away (e.g., 1-10 nautical miles) than the non zero distance by which the SBI's 54 and 56 are separated, this assumption may introduce a manageable or negligible error into the target-coordinate calculation.

It is known from Euclidian geometry that the surfaces of two right cones—a right cone is a cone the cross section of which is a circle in any plane perpendicular to the cone axis—with a common vertex intersect each other along a plane that also intersects the common vertex.

Therefore, a signal emitted from the target T defines two right cones 82 and 84 having cone angles $\alpha$ and $\beta$ and cone surfaces 86 and 88 that intersect in an elevation plane 90, which is perpendicular to the plane in which FIG. 5 lies and which approximately passes through the target and the common point 80. Because the target T is much farther away than the distances (e.g., a few meters or less) between the boresights of the SBIs 54 and 56 and the common point 80, one may further simplify the mathematics by assuming that the cones 82 and 84 share a common vertex at the common point 80, and this assumption may introduce only a manageable of negligible error into the coordinate calculation. But this assumption is not shown in FIG. 5.

The angle that the elevation plane 90 makes with the heading 52 is the approximate azimuth angle $\theta_{AZ}$ of the target T relative to the fighter jet 50 (FIG. 4).

The computer system (not shown in FIG. 5) on board the fighter jet 50 (FIG. 4) may identify the elevation plane 90 using a number of conventional techniques. For example, the computer system may determine the elevation plane 90 by solving equation (2) for both cone angles α and β, identifying at least three points that are approximately common to both cone surfaces 86 and 88, and then determining from these common points the elevation plane, which is the plane in which these points all approximately lie.

Once the onboard computer system (not shown in FIG. 5) identifies the elevation plane 90, it may determine the approximate azimuth angle between the jet heading 52 and the elevation plane (and thus the approximate azimuth angle $\theta_{AZ}$ of the target T relative to the jet 50 of FIG. 4) using one of a number of conventional mathematical techniques.

FIG. 6 is a side view of the SBIs 54 and 56 of FIG. 5, where the page of FIG. 6 lies in, or is parallel to, the elevation plane 90 of FIG. 5.

It is known from Euclidian geometry that two right cones having a common vertex not only intersect along a plane that includes the vertex, but also intersect along a hyperbola that lies within this plane of intersection. And it is also known from Euclidian geometry that a hyperbola is an asymptotically bounded curve; that is, where a hyperbola lies in the x-y plane, as x and y approach infinity the hyperbola approaches two definable asymptote lines that intersect each other at the common cone vertex.

Therefore, the cone surfaces 84 and 86 (FIG. 5) intersect along a hyperbola 92, which lies in the elevation plane 90 (FIG. 5) and which approximately intersects the target T; and the hyperbola is bounded by two asymptotes 94 and 96, which intersect each other at the common cone vertex 80.

Therefore, where the target T is a ground-based target, the onboard computer system (not shown in FIG. 6) of the fighter jet 50 (FIG. 4) may determine the approximate elevation angle $\theta_{EL}$ of the target relative to the jet 50 (FIG. 4) from the asymptote 94 as discussed below.

First, the onboard computer system may determine the hyperbola 92 by calculating equation (2) for both cone surfaces 86 and 88 (FIG. 5) and plotting some of the points approximately common to both surfaces.

Next, the onboard computer system identifies the asymptotes 94 and 96 from the hyperbola 92 using a conventional mathematical technique.

Because the target T is typically a significant distance (e.g., at least one nautical mile in the y dimension) from the fighter jet 50 (FIG. 4), the onboard computer system may estimate that the target lies on a portion of the hyperbola 92 that is relatively close to the asymptote 94.

Based on this estimate, the onboard computer system may estimate that the approximate elevation angle $\theta_{EL}$ between the ground-based target T and the fighter jet 50 is approximately equal to the angle between the bottom asymptote 94 and an azimuth plane 98, which intersects the center of the jet 50 and which is approximately parallel to the ground.

Furthermore, from the elevation angle $\theta_{EL}$ and the height h of the jet 50 above the ground—h may be obtainable from the jet's altimeter—the onboard computer system may calculate the approximate slant range R between the jet and the target T from the law of sines according to the following equation:

$$R = h/\sin \theta_{EL} \quad (3)$$

Referring to FIGS. 4-6, a procedure that the computer system (not shown in FIGS. 5 and 6) onboard the jet 50 (FIG. 4) may implement to estimate $\theta_{AZ}$, $\theta_{EL}$, and R of the target T relative to the jet is described, where the target T is located on the side of the jet from which the SBIs 54 and 56 protrude and within a region at least partially defined by the SBI axes 68 and 70.

First, the SBI's 54 and 56 receive a signal emitted from the target T. For example, the target T may be an anti-aircraft weapon, and the target may emit one or more pulses to "lock" the weapon on $X_O$ the jet 50.

Next, in response to the signal received from the target T, the SBI's 54 and 56 each generate one or more respective signals, which the computer system (not shown in FIGS. 4-6) on board the jet 50 receives.

Then, in response to the received signals from the SBI's 54 and 56, the onboard computer system identifies the type of the target T by comparing the signals received from the SBIs with one or more target signatures stored in a look-up table (not shown in FIGS. 4-6). For example, the computer system may identify the target T as a stationary ground-based target such as a portable missile launcher.

Further in response to the signals received from the SBIs 54 and 56, the onboard computer system may determine the angles α and β that the signal emitted from the target T makes with the respective SBIs.

Next, using, e.g., equation (2), the onboard computer system effectively identifies the surfaces 84 and 86 of the cones 80 and 82 that the angles α and β define, and identifies three or more points in three-dimensional space that are approximately common to both of these cone surfaces. As discussed above, these points lie approximately along the hyperbola 92 in the elevation plane 90.

Then, from the points approximately common to both cone surfaces 84 and 86, the onboard computer determines the hyperbola 92, the elevation plane 90 in which the hyperbola lies, and the hyperbola asymptotes 94 and 96.

Next, as discussed above, the onboard computer system determines the approximate azimuth angle $\theta_{AZ}$ to be equal to the angle between the jet heading 52 and the elevation plane 90, and determines the approximate elevation angle $\theta_{EL}$ to be equal to the angle between the azimuth plane 98 and the lower asymptote 94 (again assuming that the onboard computer has identified the target T as a ground-based target).

Because in some circumstances the pilot of the jet 50 does not need to know the slant range R, the target-coordinate-determination procedure may end here. For example, where the target T may be visible from the jet 50 (FIG. 4), it may be sufficient to provide the direction of the target T so that the pilot knows where to look for the target.

But if the pilot would also like to know, or also needs to know, the slant range R, then the onboard computer system may determine R according to equation (3).

Still referring to FIGS. 4-6, alternate embodiments are contemplated. For example, if the target T emits multiple signals (e.g., multiple weapon-targeting pulses), then the onboard computer system may repeat the above procedure for each of these signals, and iteratively determine $\theta_{AZ}$, $\theta_{EL}$, and/or R, using, e.g., one or more conventional Kalman filters, so that $\theta_{AZ}$, $\theta_{EL}$, and/or R converge to values that may be more accurate than the values obtainable by performing the above procedure for only one of the signals emitted by the target. Furthermore, the onboard computer system may calculate an indicator of the statistical error (e.g., the 1-sigma value) for $\theta_{AZ}$, $\theta_{EL}$, and/or R, and display this indicator/these indicator to the pilot along with the value/values of $\theta_{AZ}$, $\theta_{EL}$, and/or R (an example of such an errors-indicator calculation and display is discussed below). Moreover, the onboard computer system may determine one or more coordinates of an air-based target (e.g., another jet or a missile) using a similar procedure, but may determine the approximately elevation angle $\theta_{EL}$ as being equal to the angle between the upper asymptote 96 and the azimuth plane 98. In addition, the computer system may be onboard a vehicle (e.g., tank, ship, spacecraft) other than a jet. Furthermore if the terrain is not flat, in the region where the target is located, then the computer system may adjust the jet altimeter reading to obtain and adjusted value for the height h. The computer system may obtain this terrain data from an onboard look-up table.

Figure 7:
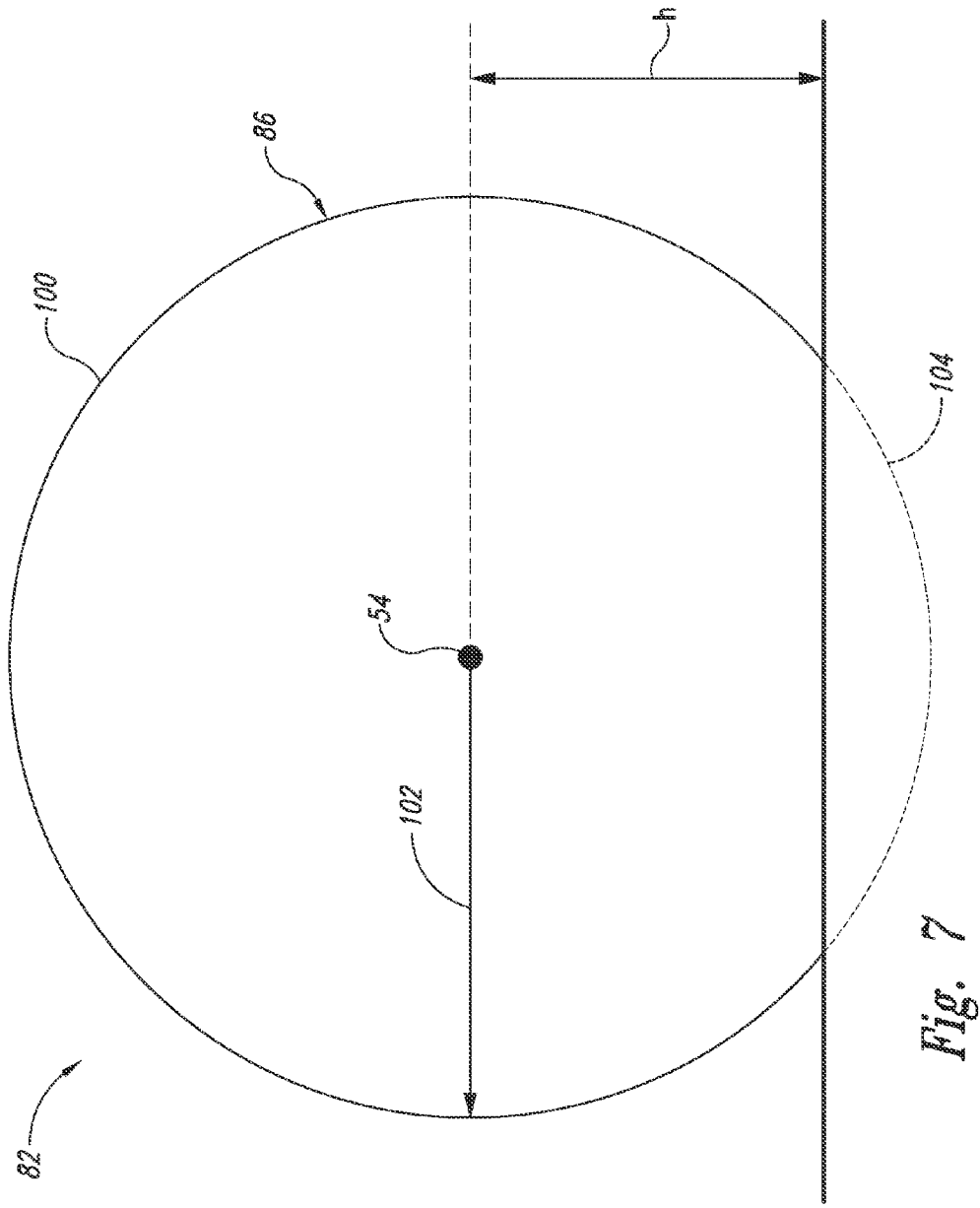
FIG. 7 is an end view of an embodiment of one of the SBIs of FIG. 5 and illustrates an intersection between a plane such as the ground and a cone surface effectively formed by a signal received with the SBI.
Figure 8:
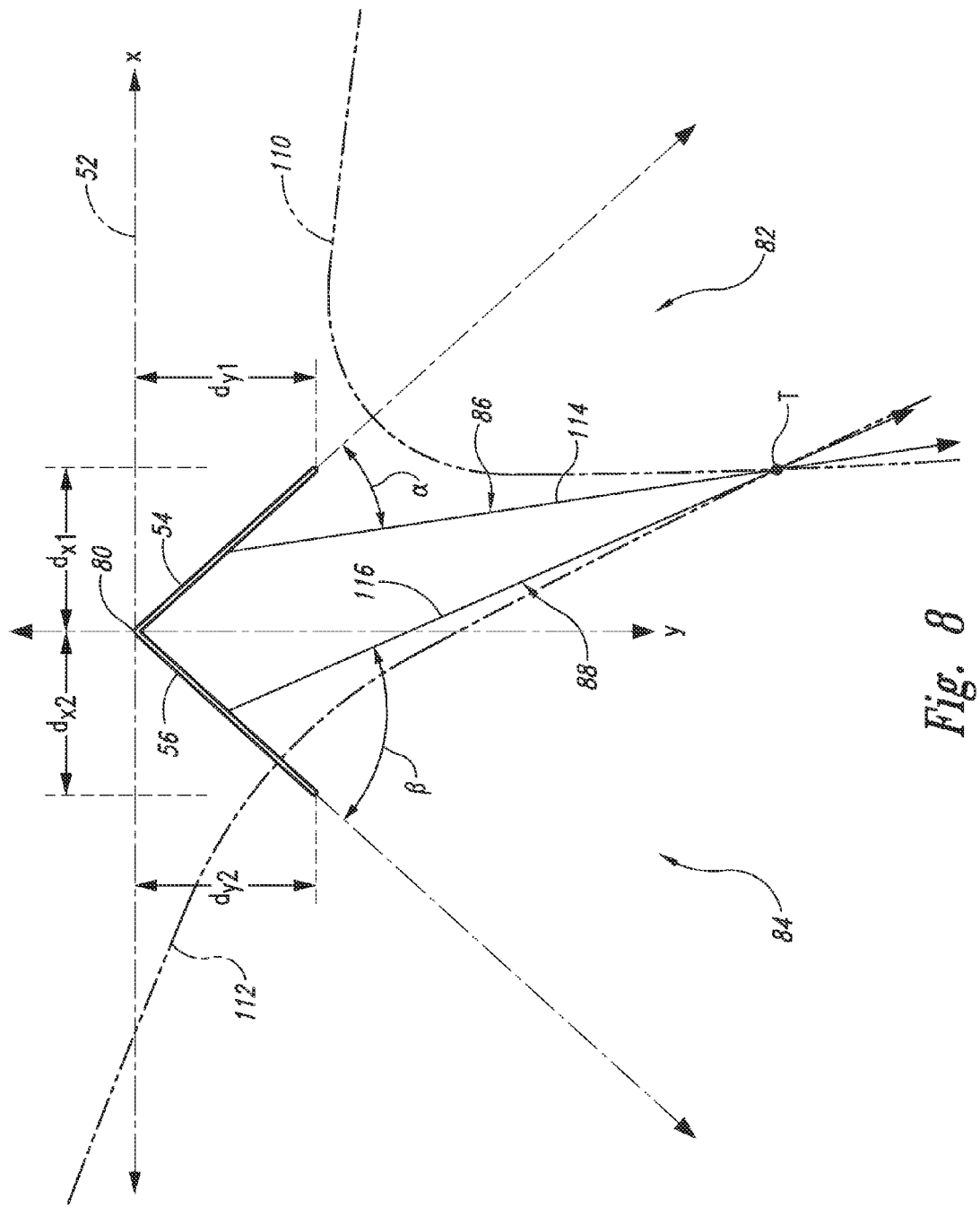
FIG. 8 is an overhead view of an embodiment of the SBIs of FIG. 5, and illustrates the curves along which the ground and the two SBI cone surfaces intersect.
Figure 9:
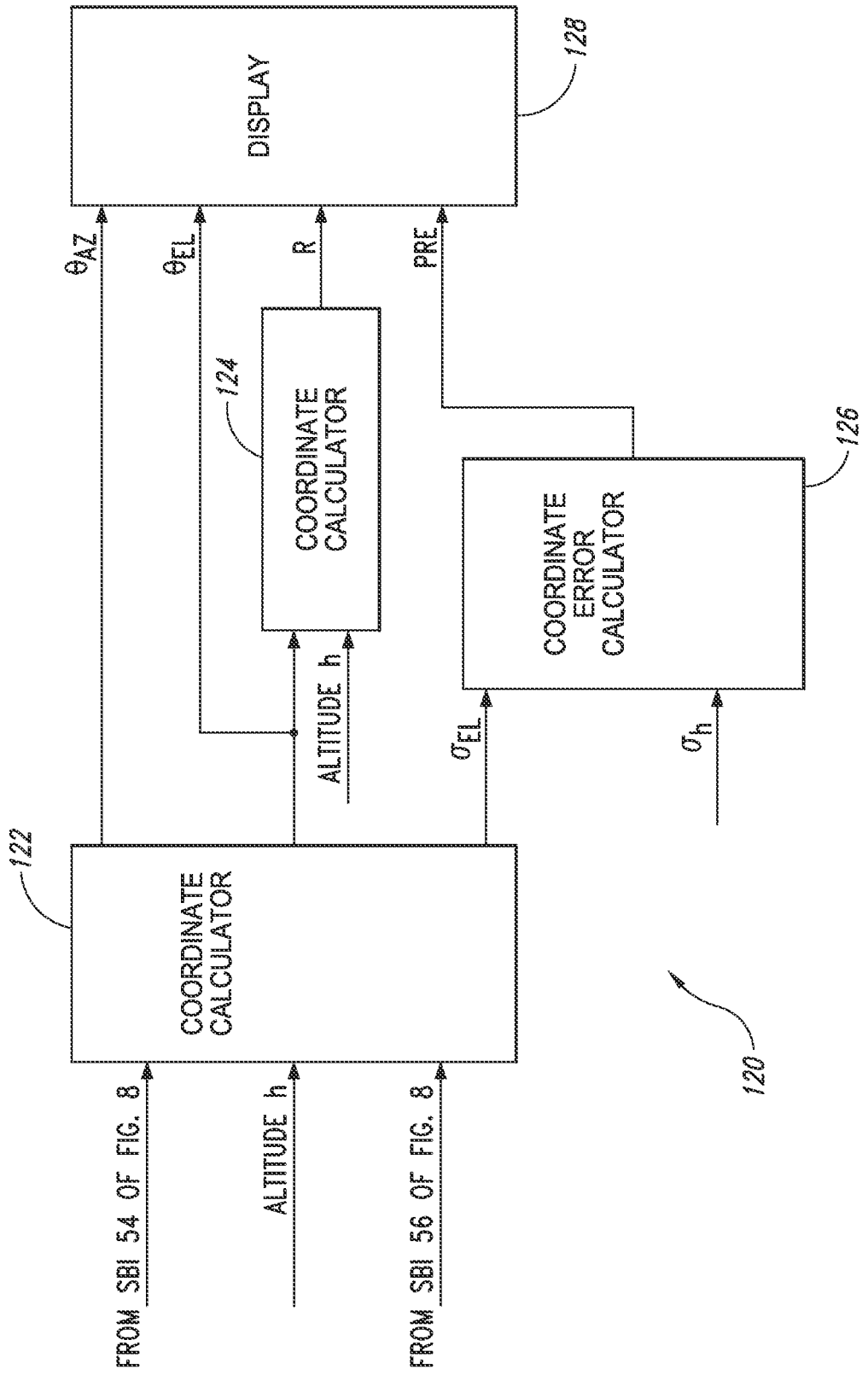
FIG. 9 is a block diagram of a computater system for determining at least two coordinates of a target from at least two cone surfaces.

FIGS. 7-9 illustrate an alternate procedure for determining the azimuth and elevation angles $\theta_{AZ}$ and $\theta_{EL}$ of a ground-based target T relative to the fighter jet 50 of FIG. 4, where the alternate procedure may be less computationally complex than the procedure described above in conjunction with FIGS. 5-6.

FIG. 7 lies in a plane that is perpendicular to the longitudinal axis of the SBI 54, and shows a circular cross section 100 of the cone surface 86 of the cone 82 in this plane. Because the radius 102 of the cross section 100 is greater than the altitude h of the fighter jet 50 (FIG. 4), a portion 104 of the cross section is effectively blocked by the ground. That is, one may approximate the ground as a plane that intersects the cone surface 86 wherever the radius of the cone 82 is greater than h.

Although not shown in FIG. 7, a similar analysis may be made regarding the cone 84 and its surface 88.

FIG. 8 is an overhead view of the SBIs 54 and 56 (the fighter jet 50 has been omitted from FIG. 8) of FIG. 4, wherein FIG. 8 lies in, or is parallel to, an azimuth plane that intersects the center of the fighter jet and that is approximately parallel to the ground. Furthermore, FIG. 8 may not be drawn to scale.

Referring to FIG. 8, it follows from the above discussion in conjunction with FIG. 7 that the intersection of the ground and the surface 86 of the cone 82 is a hyperbola 110, that the intersection of the ground and the surface 88 of the cone 84 is a hyperbola 112, and that these two hyperbolas intersect each other only at approximately the target T.

Therefore, one can define two lines, a first line 114 that lies along the surface 86 of the cone 82 and that approximately intersects the target T, and a second line 116 that lies along the surface 88 of the cone 84 and that also approximately intersects the target. Because in Euclidian geometry two non-parallel lines can intersect each other only at a single point, equations defining the lines can only be equal at the intersection point, which is approximately the point where the target T is located. Therefore, if one finds the point where the line equations are equal, then he finds the point at which the target T is approximately located.

So, one may define the normalized directions (vectors) of the first and second lines 114 and 116 according to the following equations:

$$\cos \alpha = xd_{x1} + yd_{y1} + zd_{z1} \quad (4)$$

$$\cos \beta = xd_{x2} + yd_{y2} + zd_{z2} \quad (5)$$

where:

$x^2 + y^2 + z^2 = R^2$ (R is approximately the slant range between the common vertex 80 and the target T) (6)

$x = R \cos\theta_{EL} \cos\theta_{AZ}$ (7)

$y = R \cos\theta_{EL} \sin\theta_{AZ}$ (8)

$z = R \sin\theta_{EL}$ (9)

$d_{x1}$=the projection of the SBI 54 along the x axis (10)

$d_{y1}$=the projection of the SBI 54 along the y axis (11)

$d_{z1}$=the projection of the SBI 54 along the z axis (12)

$d_{x2}$=the projection of the SBI 56 along the x axis (13)

$d_{y2}$=the projection of the SBI 56 along the y axis (14)

$d_{z2}$=the projection of the SBI 56 along the z axis (15)

Because there are only two equations (4) and (5) and three unknown coordinates x, y, and z, one may normalize equations (4)-(9) by setting R=1. Furthermore, to simplify the mathematics, one may assume that the cone angles $\alpha$ and $\beta$ are measured relative to the common vertex 80 and not from the boresights of the respective SBIs 54 and 56. Alternatively, one may measure the cone angles $\alpha$ and $\beta$ relative to the respective boresights of the SBI's 54 and 56, or from the ends of the SBI's 54 and 56 remote from the fighter jet 50 and the common vertex 80. Therefore, one may determine $\theta_{AZ}$ and $\theta_{EL}$ from the normalized equations (4) and (5) as follows.

In an embodiment where the fighter jet 50 (FIG. 4) is in level flight and SBI 54 and SBI 56 are parallel to the ground when the jet is in level flight, then the $d_{z1}=d_{z2}=0$. Therefore, from equations (4) and (5), one obtains:

$$\theta_{AZ} = \text{Arctan}(\beta/\alpha) \quad (16)$$

$$\theta_{EL} = \text{Arccos}(\alpha/\cos(\text{Arctan}(\beta/\alpha))) \quad (17)$$

To resolve ambiguities where both a positive and a negative value satisfy equation (16) or equation (17), one may use other available information. For example, the onboard computer system "knows" on which side of the fighter jet 50 (FIG. 4) the SBIs 54 and 56 are located, so it "knows" that the correct $\theta_{AZ}$ is relative to that side of the jet and the heading 52. And if the computer system "knows" that the target T is a ground-based target, then it "knows" that the correct $\theta_{EL}$ points down toward the ground.

Furthermore, once the computer system determines the approximate azimuth and elevation $\theta_{AZ}$ and $\theta_{EL}$, it may determine the approximate slant range R from the altimeter reading h and $\theta_{EL}$ per equation (3) above.

Still referring to FIG. 8, the onboard computer system may also use equations (4) and (5) to determine the approximate coordinates of a target T when the fighter jet 50 (FIG. 4) is banked in a turn such that at least one of $d_{z1}$ and $d_{z2}$ does not equal zero, or when the jet includes only one SBI 54 or 56 that receives two sequential signals emitted by the target when the SBI is in different positions.

Furthermore, as discussed further below, the onboard computer system may determine an indicator of the statistical error in any one or more of the determined approximate coordinates of the target T, and provide both the coordinates and the one or more error indicators to a pilot of the fighter jet 50 (FIG. 4) so that the pilot may mentally account for the coordinate error(s) as discussed, for example, in U.S. patent application Ser. No. 12/498,310, which is incorporated by reference.

FIG. 9 is a block diagram of a portion of an onboard computer system 120, which may implement a coordinate-determination procedure similar to one or more of the embodiments discussed above in conjunction with FIGS. 4-8. The computer system 120 may be disposed on the fighter jet 50 of FIG. 4, or on another vehicle such as a sailing vessel, spacecraft, or ground vehicle.

The computer system 120 includes a first coordinate calculator 122, a second coordinate calculator 124, a coordinate-error calculator 126, and a display 128. The first coordinate calculator 122 is operable to determine at least two approximate coordinates of a target T from two cone surfaces, for example as discussed above in conjunction with FIGS. 4-8, and is also operable to determine an error indicator for at least one of the determined approximate coordinates. For example, the calculator 122 may determine $\theta_{AZ}$ and $\theta_{EL}$ according to one of the embodiments described above in conjunction with FIGS. 4-8, and may determine a 1-sigma value $\sigma_{EL}$, which is a measure of the statistical error in $\theta_{EL}$. The calculator 122 may conventionally compute an error indicator such as $\sigma_{EL}$ based on factors such as the lengths L54 and L56 of the SBIs 54 and 56 (FIG. 8), the cone angles $\alpha$ and $\beta$ (FIG. 8), and the SNR, frequency, and number of the signal(s) (e.g., pulse(s)) emitted by the target T (FIG. 8).

The second coordinate calculator 124 is operable to determine at least one other approximate coordinate of the target T from the at least one of the approximate coordinates determined by the first coordinate calculator 122 and from other information. For example, if the first coordinate calculator 122 determines $\theta_{EL}$, then the second coordinate calculator 124 may determine the slant range R from $\theta_{EL}$ and the altitude h (e.g., provided by an onboard altimeter) per equation (3) above.

The coordinate-error calculator 126 is operable to determine an error indicator for at least one of the approximate target coordinates calculated by the first and second coordinate calculators 122 and 124. For example, the coordinate-error calculator 126 may calculate the percentage error in the slant range R—this error may be called the percentage range error (PRE)—according to the following equation:

$$PRE = \frac{100}{\sin(\theta_{EL})} \sqrt{(\sigma_{EL})^2 * (\cos(\theta_{EL}))^2 + (\sin(\theta_{EL}))^2 \left(\frac{\sigma_h}{h}\right)^2}$$

where $\sigma_h$ is the 1-sigma error value of the altitude h, and may be calculated by the onboard computer system 120 in a conventional manner.

The display 128 is operable to display the at least two approximate target coordinates from the first coordinate-calculator 122, the at least one approximate target coordinate from the second coordinate-calculator 124, and the at least one error indicator from the coordinate-error calculator 126. For example, the display 128 may display to a pilot of the fighter jet 50 (FIG. 4) $\theta_{AZ}$ and $\theta_{EL}$ from the first coordinate calculator 122, R from the second coordinate calculator 124, and PRE from the coordinate-error calculator 128.

The operator (not shown in FIG. 9) of the vehicle on which the onboard computer system 120 is disposed may use the displayed coordinates and error indicator to determine the location of a target T, and the best action to take in response to the target. For example, a pilot of the fighter jet 50 (FIG. 4) may use the displayed $\theta_{AZ}$ and $\theta_{EL}$ to visually spot a detected target T, or may use the displayed R and PRE values to decide whether he has sufficient time to evade detection by the target, or to evade a projectile fired by the target, or whether the target is in range of a missile or other weapon onboard the jet.

Referring to FIGS. 8 and 9, an embodiment of the operation of the onboard computer system 120 is discussed.

First, the coordinate calculator 122 receives one or more signals from each of the SBIs 54 and 56 in response to the SBIs having received one or more signals emitted by a target T. The coordinate calculator 122 or another component of the onboard computer system 120 may first process these signals to detect the target T and determine the target type (e.g., stationary ground-based target).

Next, from the received SBI signals, the coordinate calculator 122 determines at least two approximate coordinates of the target T, and may also determine an error indicator for at least one of the determined coordinates, as discussed above in conjunction with equations (4)-(17). For example, the coordinate calculator 122 may calculate $\theta_{AZ}$, $\theta_{EL}$, and $\sigma_{EL}$. The calculator 122 may determine the coordinates and error indicator once, or may iteratively calculate these quantities using, for example, one or more Kalman filters.

Then, the coordinate calculator 124 determines at least one other approximate coordinate of the target T. For example, the calculator 124 may determine the slant range R from $\theta_{EL}$ and h per equation (3) above.

Next, the coordinate-error calculator 126 determines an error indicator for at least one of the approximate target coordinates determined by the coordinate calculators 122 and 124. For example, the error calculator 126 may determine PRE from $\sigma_{EL}$ and $\sigma_h$ per equation (18) above.

Then, the display 128 displays to an operator such as a pilot the target coordinates generated by the coordinate calculators 122 and 124 and the error indicator(s) generated by the coordinate-error calculator 126.

Still referring to FIGS. 8 and 9, alternate embodiments are contemplated. For example, the onboard computer system 120 may determine target coordinates using a two-cone technique other than that discussed above in conjunction with FIGS. 4-18. Furthermore, the operational embodiments described above may include more or fewer steps than those described, and the steps may be performed in an order different than that described. Moreover, the onboard computer system 120 may perform any step in hardware, software, or a combination of hardware and software. In addition, the computer system 120 may determine target coordinates using two or more intersecting surfaces (e.g., one or more nonplanar surfaces) where at least one of the surfaces is other than a cone surface.

Figure 10:
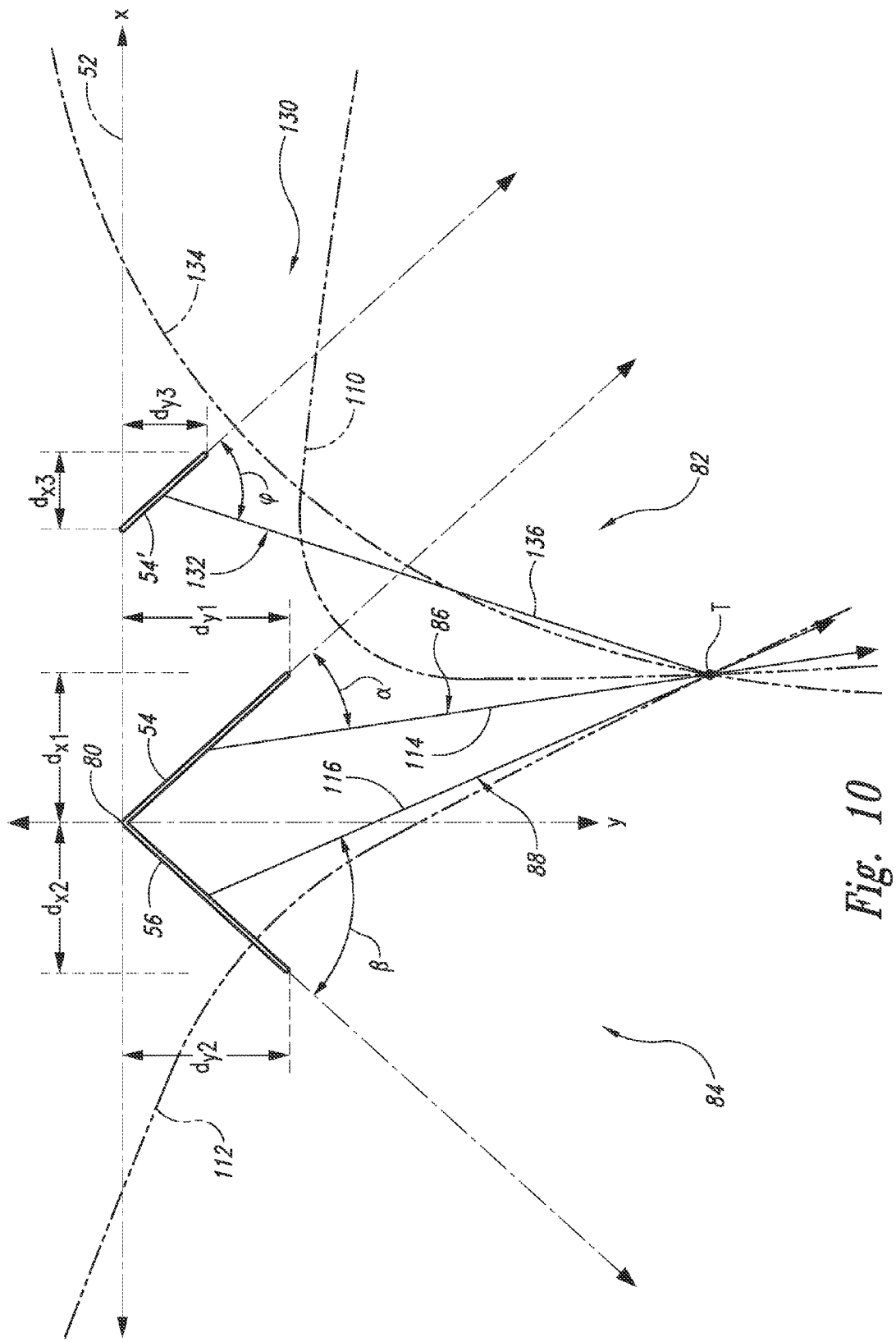
FIG. 10 is an overhead view of an embodiment of the SBIs of FIG. 5 in sequential positions, and illustrates the curves along which the ground and the three SBI cone surfaces intersect.

FIG. 10 illustrates an embodiment of an alternate procedure for determining the approximate azimuth and elevation angles $\theta_{AZ}$ and $\theta_{EL}$ and the approximate slant range R of a ground-based target T relative to the fighter jet 50 of FIG. 4, where the alternate procedure involves using at least three cones instead of only two cones. By using at least three cones, a computer system onboard the jet may unambiguously determine at least three coordinates of the target T, even without using the height h.

FIG. 10 is an overhead view of the SBIs 54 and 56 (the fighter jet 50 has been omitted from FIG. 8) of FIG. 4 in a first position, and the SBI 54 in a second position (the second position is indicated by 54'), wherein FIG. 10 lies in, or is parallel to, an azimuth plane that intersects the center of the fighter jet and that is approximately parallel to the ground. Furthermore, FIG. 10 may not be drawn to scale.

FIG. 10 is similar to FIG. 8 except that it also includes the SBI 54', a cone 130 formed relative to the SBI 54' and having a surface 132 and an angle $\phi$, and a portion of an ellipse 134 that represents the intersection of the cone 130 and the ground and that approximately intersects the target T.

Unlike the SBI 54 which is assumed to be level when the fighter jet 50 of FIG. 4 is in level flight, the SBI 54' has a nonzero component $d_{z3}$ in the z dimension, which is perpendicular to the page of FIG. 10. In the following discussion, it is assumed that the SBI 54' is pointing down toward the ground such that the intersection of the cone surface 132 and the ground is the ellipse 134. But the following discussion may also apply when the SBI 54' is pointing upward or when it is level such that the intersection of the cone surface 132 and the ground is a hyperbola or a curve other than an ellipse. And the following discussion may also apply where $d_{z1}$ and $d_{z2}$ of the SBI 54 and the SBI 56 are non zero and $d_{z3}$ is either zero or non zero.

Because the hyperbola 110, the hyperbola 112, and the ellipse 134 intersect each other only at approximately the target T, one may define three lines that approximately intersect the target T: the first line 114 that lies along the surface 86 of the cone 82, the second line 116 that lies along the surface 88 of the cone 84, and a third line 136 that lies along the surface 132 of the cone 130. Because in Euclidian geometry three non-parallel lines can intersect each other only at a single point, equations defining the lines can only be equal at a simple point located approximately at the target T. Therefore, if one finds the point where the three line equations are equal, then he finds the point at which the target T is approximately located. Furthermore, because there are three equations and three unknowns (the three target coordinates in three-dimensional space), all three approximate target coordinates may be determined directly and unambiguously without the need to normalize the equations or to use additional information (e.g., that the target is ground based) to unambiguously determine the target coordinates.

So, one may respectively define the first, second, and third lines 114, 116, and 136 according to the following equations (equations that are the same as those discussed above are given new numbers here to avoid confusion):

$$\cos \alpha = x d_{x1} + y d_{y1} + z d_{z1} \quad (19)$$

$$\cos \beta = x d_{x2} + y d_{y2} + z d_{z2} \quad (20)$$

$$\cos \phi = x d_{x3} + y d_{y3} + z d_{z3} \quad (21)$$

where:

$x^2 + y^2 + z^2 = R^2$ ($R$ is the approximate slant range between the common vertex 80 and the target $T$, and it is assumed that the distance between the SBI 54 and the SBI 54' is small enough to estimate that the vertex 80 is also the vertex of the SBI 54') (22)

$$x = R \cos \theta_{EL} \cos \theta_{AZ} \quad (23)$$

$$y = R \cos \theta_{EL} \sin \theta_{AZ} \quad (24)$$

$$z = R \sin \theta_{EL} \quad (25)$$

$d_{x1}$=the projection of the SBI 54 along the $x$ axis (26)

$d_{y1}$=the projection of the SBI 54 along the $y$ axis (27)

$d_{z1}$=the projection of the SBI 54 along the $z$ axis (28)

$d_{x2}$=the projection of the SBI 56 along the $x$ axis (29)

$d_{y2}$=the projection of the SBI 56 along the $y$ axis (30)

$d_{z2}$=the projection of the SBI 56 along the $z$ axis (31)

$d_{x3}$=the projection of the SBI 54' along the $x$ axis (assuming that the SBI 54' originates at the point 80 to reduce computational complexity) (32)

$d_{y3}$=the projection of the SBI 54' along the $y$ axis (assuming that the SBI 54' originates at the point 80 to reduce computational complexity) (33)

$d_{z3}$=the projection of the SBI 54' along the $z$ axis (assuming that the SBI 54' originates at the point 80 to reduce computational complexity) (34)

Furthermore, to simplify the mathematics, one may assume that the cone angles α, β, and φ are measured relative to the common vertex 80 and not from the boresights of the respective SBIs 54, 56, and 54'. Alternatively, one may measure the cone angles α, β, and φ relative to the respective boresights of the SBI's 54, 56, and 54', or from the ends of the SBI's 54, 56, and 54' remote from the fighter jet 50 and the common vertex 80. Therefore, one may determine x, y, and z from the following equations:

$$D = \begin{bmatrix} d_{x1} & d_{y1} & d_{z1} \\ d_{x2} & d_{y2} & d_{z2} \\ d_{x3} & d_{y3} & d_{z3} \end{bmatrix} \quad (35)$$

$$D_x = \begin{bmatrix} \cos\alpha & d_{y1} & d_{z1} \\ \cos\beta & d_{y2} & d_{z2} \\ \cos\varphi & d_{y3} & d_{z3} \end{bmatrix} \quad (36)$$

$$D_y = \begin{bmatrix} d_{x1} & \cos\alpha & d_{z1} \\ d_{x2} & \cos\beta & d_{z2} \\ d_{x3} & \cos\varphi & d_{z3} \end{bmatrix} \quad (37)$$

$$D_z = \begin{bmatrix} d_{x1} & d_{y1} & \cos\alpha \\ d_{x2} & d_{y2} & \cos\beta \\ d_{x3} & d_{y3} & \cos\varphi \end{bmatrix} \quad (38)$$

$$x = \frac{|D_x|}{|D|} \quad (39)$$

$$y = \frac{|D_y|}{|D|} \quad (40)$$

$$z = \frac{|D_z|}{|D|} \quad (42)$$

where "| |" indicates the determinant of the enclosed matrix, and where |D|≠0 (if |D|=0, then one may use a conventional technique such as Gaussian elimination to solve the linear system of equations (19)-(21)).

As discussed further below, the onboard computer system may also determine an indicator of the statistical error in any one or more of the determined approximate coordinates of the target T, and provide both the coordinates and the one or more error indicators to a pilot of the fighter jet 50 (FIG. 4) so that the pilot may mentally account for the coordinate error(s) as discussed, for example, in U.S. patent application Ser. No. 12/498,310, which is incorporated by reference.

Figure 11:
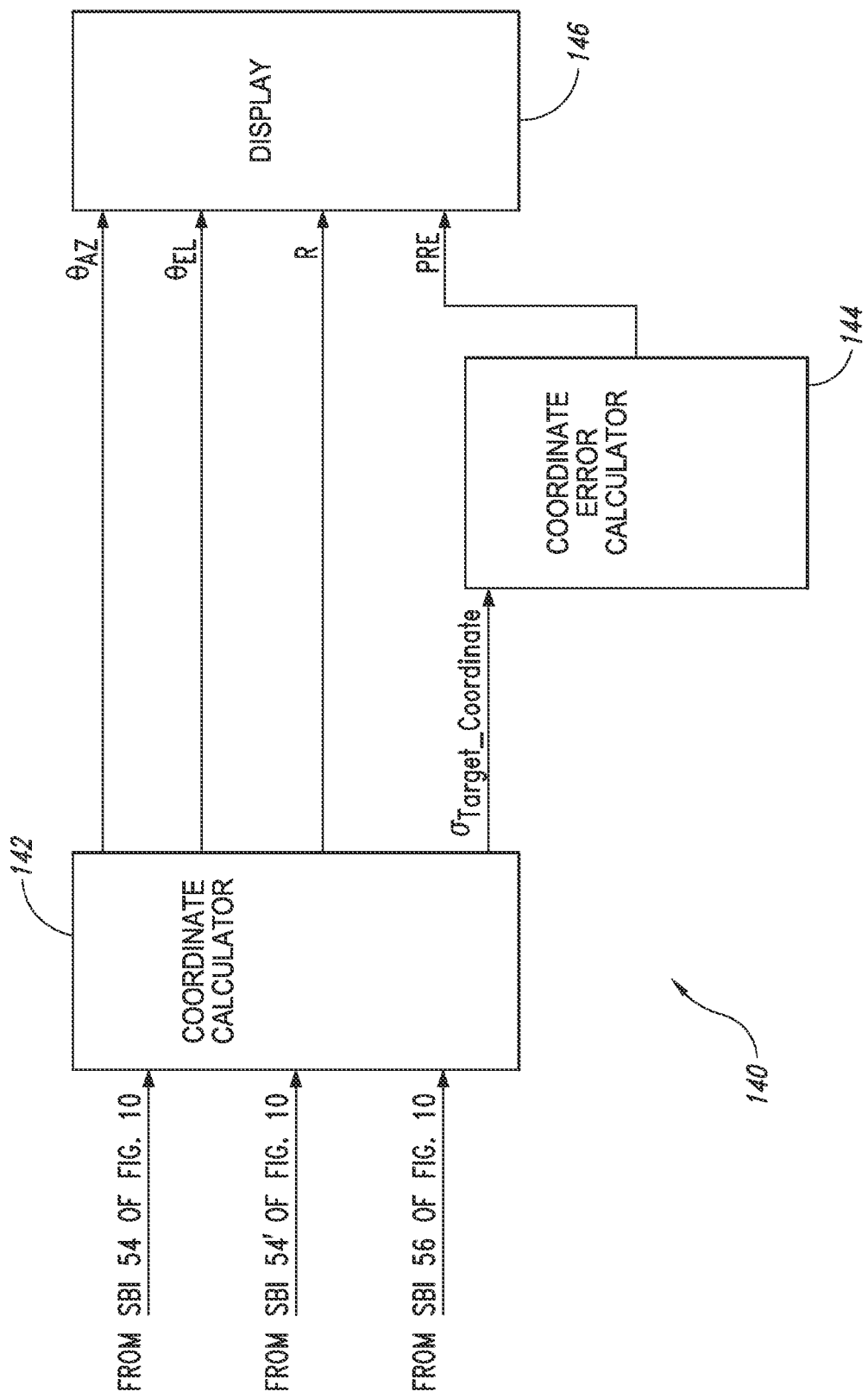
FIG. 11 is a block diagram of a computater system for determining at least three coordinates of a target from at least three cone surfaces.

FIG. 11 is a block diagram of a portion of an onboard computer system 140, which may implement a coordinate-determination procedure similar to one or more of the embodiments discussed above in conjunction with FIG. 10. The computer system 140 may be disposed on the fighter jet 50 of FIG. 4, or on another vehicle such as a sailing vessel or ground vehicle.

The computer system 140 includes a coordinate calculator 142, a coordinate-error calculator 144, and a display 146.

The coordinate calculator 142 is operable to determine at least three approximate coordinates of a target T from at least three cone surfaces, for example as discussed above in conjunction with FIG. 10, and is also operable to determine an error indicator for at least one of the determined coordinates. For example, the calculator 142 may determine $\theta_{AZ}$, $\theta_{EL}$, and R according to one of the embodiments described above in conjunction with FIG. 10, and may determine a 1-sigma value $\sigma_{Target\_Coordinate}$, which is a measure of the statistical error in one of the determined coordinates. The calculator 142 may conventionally compute an error indicator such as $\sigma_{Target\_Coordinate}$ based on factors such as the length of the SBIs 54, 54', and 56 (FIG. 10), the cone angles α, β, and φ

(FIG. 10), and the SNR, frequency, and number of the signal(s) (e.g., pulse(s)) emitted by the target T (FIG. 10).

The coordinate-error calculator 144 is operable to determine an error indicator for at least one of the target coordinates calculated by the coordinate calculator 142. For example, the coordinate-error calculator 144 may calculate the PRE according to equation (18) above, where $\sigma_{Target\_Coordinate} = \sigma_{EL}$.

The display 146 is operable to display the at least three approximate target coordinates from the coordinate calculator 142 and the at least one error indicator from the coordinate-error calculator 144. For example, the display 146 may display to a pilot of the fighter jet 50 (FIG. 4) $\theta_{AZ}$, $\theta_{EL}$, and R from the coordinate calculator 142 and PRE from the coordinate-error calculator 144.

The operator (not shown in FIG. 1) of the vehicle on which the onboard computer system 140 is disposed may use the displayed coordinates and error indicator to determine the location of a target and the best action to take in response to the target. For example, a pilot of the fighter jet 50 (FIG. 4) may use the displayed $\theta_{AZ}$ and $\theta_{EL}$ to visually locate a detected target, and may use the displayed R and PRE values to decide whether he has sufficient time to evade detection by the target, to evade a projectile fired by the target, or whether the target is in range of a missile or other weapon onboard the jet.

Referring to FIGS. 10 and 11, an embodiment of the operation of the onboard computer system 140 is discussed.

First, the coordinate calculator 142 receives one or more signals from each of the SBIs 54 and 56 in response to the SBIs having received one or more signals from a target T. The coordinate calculator 142 or another component of the onboard computer system 140 may first process these signals in a conventional manner to detect the target T and determine the target type (e.g., a stationary ground-based target).

Next, the coordinate calculator 142 receives one or more signals from the SBI 54', which as discussed above, is the SBI 54 in a different position at a subsequent time. For example, SBI 54' position may be due to a change in the attitude (e.g., due to a slight pitch, roll, or "wing dip") of the fighter jet 50 (FIG. 4) soon after (e.g., within approximately 10 milliseconds to a few seconds) after the calculator 142 receives the signals from the SBIs 54 and 56. Or, the SBI 54' may be due only to the movement of the fighter jet 50 along its heading 52, although in some situations a change in attitude between the SBI 54 and SBI 54' positions may allow more accurate determination of the target coordinates.

Then, from the received SBI signals, the coordinate calculator 142 determines at least three coordinates of the target T, and may also determine a statistical measure of the error for at least one of the determined coordinates, as discussed above in conjunction with equations (19)-(42). For example, the coordinate calculator 142 may calculate $\theta_{AZ}$, $\theta_{EL}$, R, $\sigma_{Target\_Coordinate}$. The calculator 142 may determine the coordinates and error indicator one time, or may calculate these quantities iteratively using, for example, a Kalman filter.

Next, the coordinate-error calculator 144 may determine an error indicator for at least one of the target coordinates determined by the coordinate calculator 142. For example, the error calculator 126 may determine PRE from $\sigma_{Target\text{-}Coordinate} = \sigma_{EL}$ per equation (18) above.

Then, the display 146 displays to an operator such as a pilot the target coordinates generated by the coordinate calculator 142 and the error indicator(s) generated by the coordinate-error calculator 144.

Still referring to FIGS. 10 and 11, alternate embodiments are contemplated. For example, the onboard computer system 140 may determine target coordinates and error indicators using a three-cone technique other than that discussed above in conjunction with equations (19)-(42). Furthermore, the operational embodiments described above may include more or fewer steps than those described, and the steps may be performed in an order different than that described. Moreover, the onboard computer system 140 may perform any step in hardware, software, or a combination of hardware and software. In addition, at least one of the surfaces used may be other than a cone surface.

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated.

What is claimed is:

1. An apparatus, comprising:
a first coordinate determiner configured:
to receive a first signal from a first antenna and a second signal from a second antenna;
to identify, in response to the first and second signals, respective first and second surfaces that each approximately intersect an object, at least one of the surfaces being nonplanar; and
to determine at least two approximate coordinates of the object from the first and second surfaces.

2. The apparatus of claim 1 wherein:
the first surface comprises a surface of a first cone; and
the second surface comprises a surface of a second cone.

3. The apparatus of claim 1 wherein the first coordinate determiner is further configured:
to identify at least one location at which the first and second surfaces approximately intersect each other; and
to determine the at least two approximate coordinates of the object from the at least one location.

4. The apparatus of claim 3 wherein the at least one location includes multiple locations that define a curve.

5. The apparatus of claim 3 wherein the at least one location includes multiple locations that define a curve that lies in a plane.

6. The apparatus of claim 3 wherein the coordinate determiner is configured to identify the at least two coordinates from the at least one location and from an estimate of a third coordinate.

7. The apparatus of claim 3 wherein the coordinate determiner is further configured:
to receive a third signal from one of the first and second antennas;
to identify, in response to the third signal, a third surface that approximately intersects the object;
to identify the at least one location as a location at which the first, second, and third surfaces approximately intersect one another; and
to determine as the at least two approximate coordinates of the object three approximate coordinates of the object from the at least one location.

8. The apparatus of claim 1 wherein the at least two coordinates include an azimuth and an elevation.

9. The apparatus of claim 1 wherein the at least two coordinates include an azimuth, an elevation, and a range.

10. The apparatus of claim 1, further comprising a second coordinate determiner configured to determine a third approximate coordinate from at least one of the at least two coordinates and from an estimate of a fourth coordinate.

11. The apparatus of claim 1 wherein the coordinate determiner is further configured to determine an indication of an error in at least one of the at least two determined coordinates.

12. The apparatus of claim 1, further comprising:
wherein the coordinate determiner is further configured to determine a first indication of an error in at least one of the at least two determined coordinates; and
an error calculator configured to calculate from the first indication of an error a second indication of an error in a third approximate coordinate.

13. The apparatus of claim 1 wherein the first coordinate determiner is configured:
to receive the first signal from a first interferometer; and
to receive the second signal from a second interferometer.

14. The apparatus of claim 1 wherein the first coordinate determiner is configured:
to receive the first signal from a first antenna array; and
to receive the second signal from a second antenna array.

15. The apparatus of claim 1 wherein the first coordinate determiner is configured:
to receive the first signal from a first interferometer having a longitudinal axis;
to receive the second signal from a second interferometer having a longitudinal axis that intersects the longitudinal axis of the first interferometer at an angle of less than 180°.

16. A vehicle, comprising:
a first coordinate determiner configured:
to receive a first signal from a first antenna and a second signal from a second antenna;
to identify, in response to the first and second signals, first and second surfaces that each approximately intersect an object, at least one of the surfaces being nonplanar; and
to determine at least two approximate coordinates of the object from the first and second surfaces.

17. The system of claim 16 wherein the vehicle includes an airplane.

18. A system, comprising:
a vehicle, including:
a first coordinate determiner configured:
to identify from a first signal a first surface that approximately intersects an object,
to identify from a second signal a second surface that approximately intersects the object, at least one of the first and second surfaces being nonplanar, and
to determine at least two approximate coordinates of the object from the first and second surfaces; and
first and second interferometers secured to the vehicle and respectively configured to generate the first and second signals in response to the object.

19. The system of claim 18 wherein the first and second interferometers are respectively configure to generate the first and second signals in response to a third signal emanating from the object.

20. The system of claim 18 wherein the first and second interferometers are respectively configured to generate the first and second signals in response to a third signal generated by the object.

21. The system of claim 18 wherein:
the first interferometer has a first orientation relative to the vehicle; and
the second interferometer has a second orientation relative to the vehicle.

22. A method, comprising:
receiving from first and second antenna arrays respective first and second signals;
identifying, in response to the first and second signals, respective first and second surfaces that each approximately intersect an object, at least one of the surfaces being three-dimensional; and
determining at least two approximate coordinates of the object from the first and second surfaces.

23. The method of claim 22 wherein determining at least two coordinates includes:
identifying at least one location at which the first and second surfaces approximately intersect; and
determining the at least two approximate coordinates from the at least one location.

24. The method of claim 22 wherein determining the at least two approximate coordinates includes determining the at least two coordinates from a first equation that defines at least a portion of the first surface and from a second equation that defines at least a portion of the second surface.

25. The method of claim 22, further comprising:
receiving the first signal from the object with the first antenna array;
determining a first approximate direction of the object relative to the first antenna array; and
wherein identifying the first surface includes identifying the first surface from the first approximate direction.

26. The method of claim 25, further comprising:
receiving the second signal from the object with the second antenna array;
determining a second approximate direction of the object relative to the second antenna array; and
wherein identifying the second surface includes identifying the second surface from the second approximate direction.

27. The method of claim 22, further comprising:
receiving from a third antenna array a third signal;
identifying, in response to the third signal, a third surface that approximately intersects the object; and
wherein determining the at least two coordinates includes determining three approximate coordinates of the object from the first, second, and third surfaces.

28. A non-transitory computer-readable medium storing program instructions that, when executed by a computing apparatus, cause the computing apparatus or another apparatus under the control of the computing apparatus:
to identify first and second surfaces that each approximately intersect an object in response to respective first and second signals respectively received by first and second antennas, at least one of the surfaces being three-dimensional; and
to determine at least two approximate coordinates of the object from the first and second surfaces.

29. A method, comprising:
receiving first and second signals from respective first and second antennas;
identifying, in response to the first and second signals, respective first and second angles of respective first and second cones having respective first and second surfaces that each approximately intersect an object; and
determining at least two approximate coordinates of the object from the first and second angles.

30. The method of claim 29 wherein the identifying includes:
identifying first and second receive angles at which the first and second antennas receive the first and second signals, respectively; and
identifying the first and second angles of the first and second cones in response to the first and second receive angles, respectively.

31. The method of claim 29 wherein the identifying includes:
- identifying first and second receive angles at which the first and second antennas receive the first and second signals relative to the respective boresight axes of the first and second antennas; and
- identifying the first and second angles of the first and second cones in response to the first and second receive angles, respectively.

32. An apparatus, comprising:
a coordinate determiner configured:
- to receive a first signal from a first portion of an antenna and a second signal from a second portion of an antenna;
- to identify, in response to the first and second signals, respective first and second surfaces that each approximately intersect an object, at least one of the surfaces being nonplanar; and
- to determine at least two approximate coordinates of the object from the first and second surfaces.

* * * * *